United States Patent
Onoda et al.

(10) Patent No.: US 9,689,474 B2
(45) Date of Patent: Jun. 27, 2017

(54) CHAIN TENSIONER

(71) Applicant: TSUBAKIMOTO CHAIN CO., Osaka-shi, Osaka (JP)

(72) Inventors: Nobuyuki Onoda, Osaka (JP); Osamu Yoshida, Osaka (JP); Yuji Kurematsu, Osaka (JP)

(73) Assignee: TSUBAKIMOTO CHAIN CO., Osaka (JP)

(*) Notice: Subject to any disclaimer, the term of this patent is extended or adjusted under 35 U.S.C. 154(b) by 4 days.

(21) Appl. No.: 14/718,837

(22) Filed: May 21, 2015

(65) Prior Publication Data

US 2015/0354673 A1    Dec. 10, 2015

(30) Foreign Application Priority Data

Jun. 6, 2014    (JP) .................. 2014-117470

(51) Int. Cl.
*F16H 7/22* (2006.01)
*F16H 7/08* (2006.01)

(52) U.S. Cl.
CPC .............. *F16H 7/08* (2013.01); *F16H 7/0836* (2013.01); *F16H 7/0848* (2013.01); *F16H 2007/0806* (2013.01); *F16H 2007/0812* (2013.01)

(58) Field of Classification Search
CPC ..... F16H 2007/0853; F16H 2007/0806; F16H 2007/0859; F16H 7/0848; F16H 2007/0812
USPC ......................................................... 474/110
See application file for complete search history.

(56) References Cited

U.S. PATENT DOCUMENTS

| | | | | |
|---|---|---|---|---|
| 5,366,415 A | * | 11/1994 | Church | F16H 7/0848 474/110 |
| 6,935,978 B2 | * | 8/2005 | Hayakawa | F16H 7/0836 474/109 |
| 7,186,195 B2 | * | 3/2007 | Hellmich | F16H 7/0848 474/101 |
| 7,691,017 B2 | * | 4/2010 | Seungpyo | F16H 7/0836 267/155 |
| 9,394,976 B2 | * | 7/2016 | Duffy | F16H 7/0848 |
| 2003/0125143 A1 | * | 7/2003 | Seungpyo | F16H 7/0848 474/110 |

(Continued)

FOREIGN PATENT DOCUMENTS

| | | |
|---|---|---|
| JP | 11-344036 A | 12/1999 |
| JP | 2004-44749 A | 2/2004 |
| JP | 2006-234088 A | 9/2006 |

*Primary Examiner* — Henry Liu
(74) *Attorney, Agent, or Firm* — Westerman, Hattori, Daniels & Adrian, LLP

(57) ABSTRACT

Provided is a chain tensioner that is capable of restricting the movement of a plunger at an engagement position, hardly causes its breakage and abrasion even if receiving a great force applied to the plunger, needs no setting for a backlash amount, and allows the engagement position of the plunger to be freely shifted forward and backward. The tensioner body has an engagement member that extends toward and retracts from engagement grooves provided on the outer periphery of the plunger, a press member that presses, in one direction, a cam member which maintains and releases the extending state of the engagement member, and a hydraulic supply path through which oil is supplied to press the cam member in a direction opposite to the pressing direction of the press member.

3 Claims, 9 Drawing Sheets

(56) References Cited

U.S. PATENT DOCUMENTS

| | | | | |
|---|---|---|---|---|
| 2004/0147349 A1* | 7/2004 | Markley | ............... | F16H 7/0848 474/109 |
| 2006/0194661 A1* | 8/2006 | Hayami | ................ | F16H 7/0836 474/110 |
| 2006/0270501 A1* | 11/2006 | Maile | .................... | F16H 7/0848 474/110 |
| 2010/0173735 A1* | 7/2010 | Suchecki | ................ | F02B 67/06 474/110 |
| 2010/0298077 A1* | 11/2010 | Hirayama | ................. | F01L 1/02 474/110 |
| 2010/0298078 A1* | 11/2010 | Hirayama | ................. | F01L 1/02 474/110 |
| 2012/0040790 A1* | 2/2012 | Perissinotto | .......... | F16H 7/0836 474/110 |
| 2012/0225743 A1* | 9/2012 | Ishii | ..................... | F16H 7/0848 474/110 |
| 2013/0288836 A1* | 10/2013 | Kurematsu | .......... | F16H 7/0836 474/110 |
| 2014/0179471 A1* | 6/2014 | Markley | ............... | F16H 7/0836 474/110 |
| 2014/0364257 A1* | 12/2014 | Duffy | .................... | F16H 7/0848 474/110 |
| 2015/0024887 A1* | 1/2015 | Oh | ........................... | F16H 7/08 474/110 |

\* cited by examiner

Fig. 3A1  Fig. 3A2        Fig. 3E1  Fig. 3E2
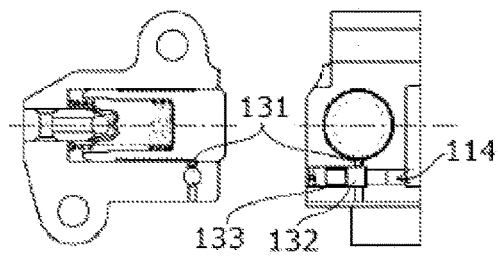 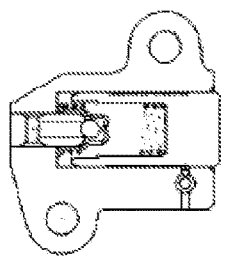 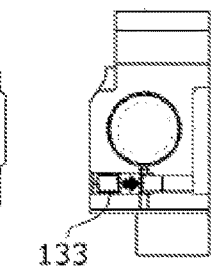
Fig. 3B1  Fig. 3B2        Fig. 3F1  Fig. 3F2
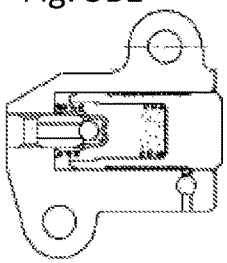 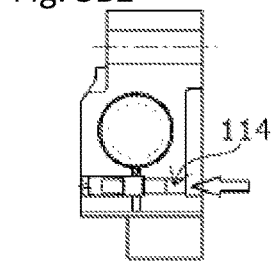 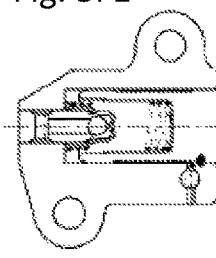 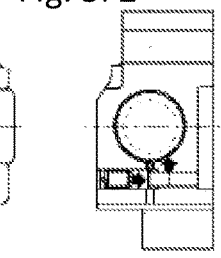
Fig. 3C1  Fig. 3C2        Fig. 3G1  Fig. 3G2
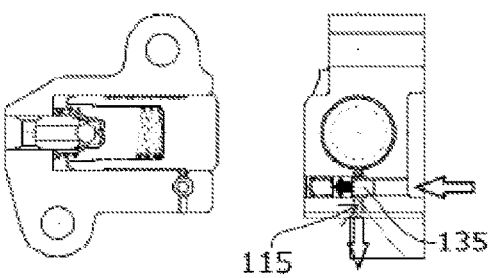 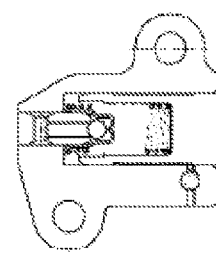 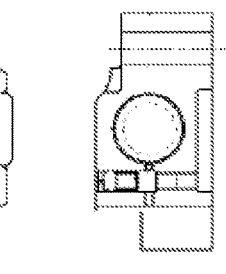
Fig. 3D1  Fig. 3D2
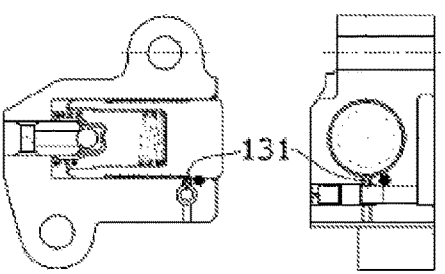

Fig. 10A
Fig. 10B
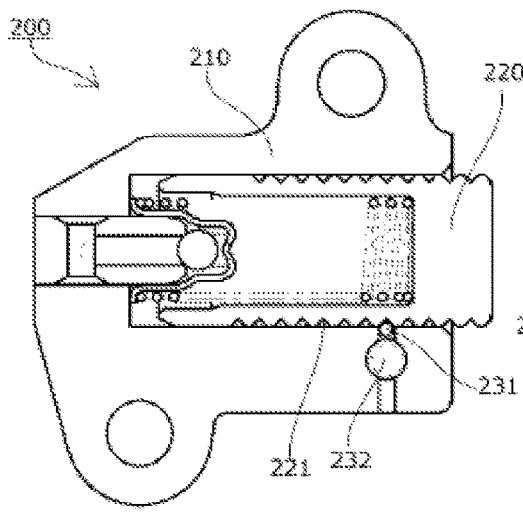
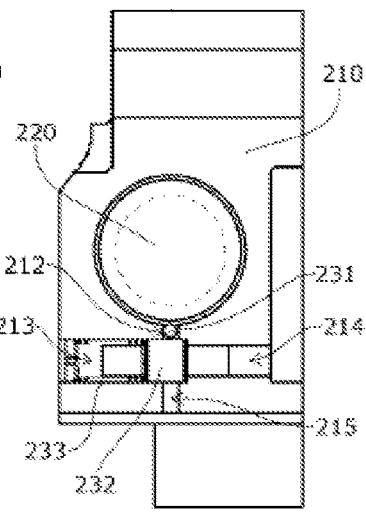
Fig. 11
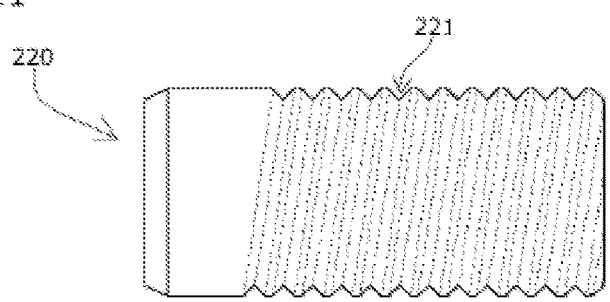

Fig. 14A
Fig. 14B
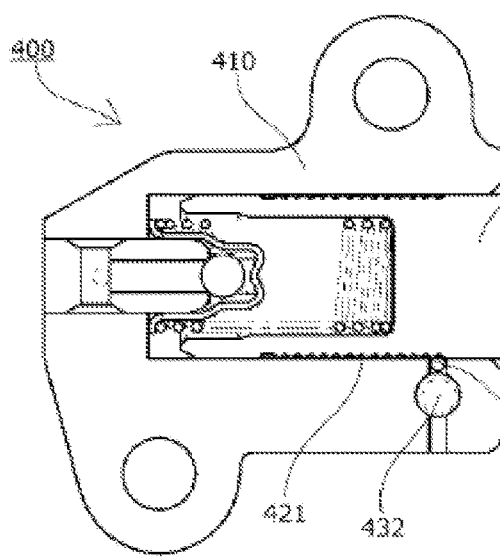
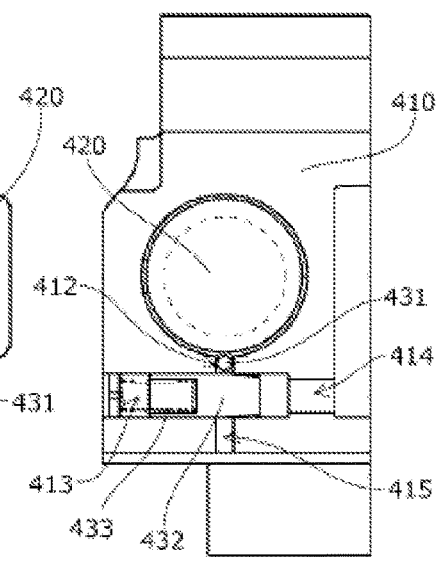
Fig. 15A
Fig. 15B
Fig. 15C
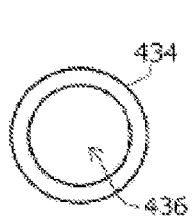
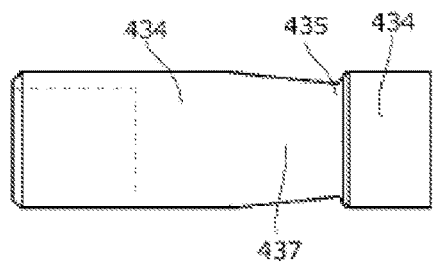

Related Art

CHAIN TENSIONER

BACKGROUND OF THE INVENTION

1. Field of the Invention

The present invention relates to a chain tensioner used to apply an appropriate tensional force to a transmission belt or a transmission chain in the timing system of an engine or the like.

2. Description of the Related Art

A known chain transmission device used in the timing system of an engine or the like generally employs, in order to apply an appropriate tensional force to the slacked side of a transmission belt or a transmission chain via a tensional lever to reduce vibration occurring at running, a chain tensioner having a tensioner body that has a plunger accommodation hole which is open on one side, a plunger slidably inserted in the plunger accommodation hole, and an urging mechanism that urges the plunger in a protruding direction with a spring or the like.

In order to restrict the movement of a plunger in an accommodation portion to prevent its fluttering due to a great change in tensional force at starting or the like and temporarily stop the protrusion of the plunger at assembling, maintenance, or the like, a conventional chain tensioner 500 is provided with, in a tensioner body 510, an oscillation cam 530 having two ratchet pawls 531 capable of engaging with rack teeth 522 formed on the side surface of a plunger 520 as shown FIG. 16 (see, for example, Japanese Patent Application Laid-open No. 2006-234088, Japanese Patent Application Laid-open No. 2004-44749, and Japanese Patent Application Laid-open No. H11-344036).

In the chain tensioner 500, the rack teeth 522 of the plunger 520 and the ratchet pawls 531 of the oscillation cam 530 engage with each other to cause a mechanical backstop to reduce noise at starting until engine oil is supplied to the chain tensioner when an engine starts, and a certain backlash is set at the same engagement position to absorb the thermal expansion of the engine and a change in the elastic elongation of a chain.

In addition, in order to deal with the elongation of the chain over a long term, the chain tensioner 500 has a mechanism in which the plunger 520 advances step by step with a change in the engagement position between the rack teeth 522 of the plunger 520 and the ratchet pawls 531 of the oscillation cam 530.

SUMMARY OF THE INVENTION

However, the oscillation cam of such a known chain tensioner receives a great force applied to a plunger with ratchet pawls that engage with rack teeth. Therefore, the oscillation cam having the ratchet pawls and an oscillation shaft needs a sufficient strength and a sufficient engagement width to prevent its breakage and abrasion.

Therefore, there is a need to select an oscillation cam made of a material such as sintered metal that is costly and low in workability.

In addition, a plunger is not allowed to retract once its engagement position is shifted forward. Therefore, in the case of, for example, driving by which the elastic elongation of a chain is caused in a super-cold period, the plunger advances to a position ahead of a desired appropriate engagement position, and an oscillation cam with ratchet pawls receives a greater force.

In order to deal with the problems, it is assumed to increase a backlash amount. However, since a starting sound becomes loud due to backlash, it is difficult to set an optimal backlash amount according to use conditions or the like.

Moreover, in order to temporarily stop the protrusion of a plunger at assembling, maintenance, or the like, there is a need to have an additional configuration and an additional operation for fixing an oscillation cam.

The present invention is directed at solving the problems and has an object of providing a chain tensioner that is capable of restricting the movement of a plunger at an engagement position, hardly causes its breakage and abrasion even if receiving a great force applied to the plunger, needs no setting for a backlash amount, and allows the engagement position of the plunger to be freely shifted forward and backward.

To this end, the present invention provides a chain tensioner including: a tensioner body having a plunger accommodation hole which is open on one side; a plunger slidably inserted in the plunger accommodation hole; and an urging mechanism that urges the plunger in a protruding direction. In the chain tensioner, the plunger has engagement grooves on an outer periphery thereof, the tensioner body has an engagement member that extends/retracts toward/from the engagement grooves from/into an inner peripheral surface of the plunger accommodation hole, a cam member that maintains and releases an extending state of the engagement member, a press member that presses the cam member in one direction, and a hydraulic supply path through which oil is supplied to press the cam member in a direction opposite to a pressing direction of the press member.

In a chain tensioner according to a first aspect of the present invention, a plunger has engagement grooves on the outer periphery thereof, and a tensioner body has an engagement member that extends/retracts toward/from the engagement grooves from/into the inner peripheral surface of a plunger accommodation hole, a cam member that maintains and releases the extending state of the engagement member, a press member that presses the cam member in one direction, and a hydraulic supply path through which oil is supplied to press the cam member in a direction opposite to the pressing direction of the press member. Therefore, the reciprocal movement of the plunger may be automatically switched between stop and release states with the supply of hydraulic pressure, and the stop and release states of the plunger may be changed with the start and stop of an engine or the like.

Accordingly, the movement of the plunger may be restricted at any engagement position with the plurality of engagement grooves, and the engagement position of the plunger is allowed to be freely shifted forward and backward.

In addition, the engagement member extends from the inner peripheral surface of the plunger accommodation hole toward the engagement grooves and engages with the engagement grooves of the plunger to stop the movement of the plunger. Therefore, an engagement strength and the strength of the engagement member may be increased, and the engagement member hardly causes its breakage and abrasion even if receiving a great force applied to the plunger.

Moreover, in a state in which the plunger is allowed to freely extend and retract, the engagement grooves and the engagement member disengage with each other. Therefore, no setting for a backlash amount is needed, and the breakage and abrasion of the engagement member are not caused.

Further, in a state in which hydraulic pressure is not supplied, the cam member is positioned such that the engagement member extends and engages with the engagement grooves. Therefore, there is no need to have an additional configuration and an additional operation for fixing an oscillation cam to temporarily stop the protrusion of the plunger at assembling, maintenance, or the like.

In the chain tensioner according to a second aspect of the present invention, the cam member is a slide bar that reciprocates linearly. Therefore, a structure for arranging the cam member so as to be operable in the tensioner body is simplified, and no complicated configuration and no complicated working are needed. As a result, an increase in the size and the cost of the chain tensioner may be reduced.

In the chain tensioner according to a third aspect of the present invention, the engagement member is formed in a spherical shape. Therefore, the engagement member may be reduced in size and have a great strength. In addition, since the engagement member rotates freely, it is prevented from intensively contacting the engagement grooves only at one portion. As a result, the breakage and abrasion of the engagement member may be reduced.

In addition, the plunger and the cam member may be arranged adjacent to each other. Therefore, an increase in the size of the chain tensioner may be reduced.

In the chain tensioner according to a fourth aspect of the present invention, the engagement grooves are formed in a spiral shape. Therefore, even if the engagement grooves and the engagement member engage with each other, the extension and retraction of the plunger is allowed at a low speed with the sliding resistance between the engagement grooves and the engagement member and the rotation resistance of the plunger about an axis in the plunger accommodation hole.

Therefore, the plunger moves at a low speed without fluttering when receiving a great force at starting or the like. As a result, an excessive force may be absorbed at the starting or the like, and noise may be also reduced.

BRIEF DESCRIPTION OF THE DRAWINGS

FIGS. 3A1 and 3A2, FIGS. 3B1 and 3B2, FIGS. 3C1 and 3C2, FIGS. 3D1 and 3D2, FIGS. 3E1 and 3E2, FIGS. 3F1 and 3F2, and FIGS. 3G1 and 3G2 show explanatory views for describing the operation of the chain tensioner according to the first embodiment of the present invention;

FIGS. 10A and 10B show cross-sectional views of a chain tensioner according to a second embodiment of the present invention when seen from the side thereof and the front thereof, respectively;

FIG. 11 shows a side view of the plunger of the chain tensioner in FIG. 10;

FIGS. 14A and 14B show cross-sectional views of a chain tensioner according to a fourth embodiment of the present invention when seen from the side thereof and the front thereof, respectively;

FIGS. 15A, 15B and 15C show both-side views and a front view of the cam member of the chain tensioner in FIG. 14.

DESCRIPTION OF THE PREFERRED EMBODIMENTS

The present invention provides a chain tensioner including a tensioner body having a plunger accommodation hole which is open on one side, a plunger slidably inserted in the plunger accommodation hole, and an urging mechanism that urges the plunger in a protruding direction. In the chain tensioner, the plunger has engagement grooves on the outer periphery thereof, the tensioner body has an engagement member that extends/retracts toward/from the engagement grooves from/into the inner peripheral surface of the plunger accommodation hole, a cam member that maintains and releases the extending state of the engagement member, a press member that presses the cam member in one direction, and a hydraulic supply path through which oil is supplied to press the cam member in a direction opposite to the pressing direction of the press member. The chain tensioner may have any specific configuration so long as it is capable of restricting the movement of the plunger at an engagement position, hardly causes its breakage and abrasion even if receiving a great force applied to the plunger, needs no setting for a backlash amount, and allows the engagement position of the plunger to be freely shifted forward and backward.

The tensioner body, the plunger, the engagement member, the cam member, or the like of the chain tensioner according to the present invention may be made of any specific material so long as it has a sufficient strength to maintain the tensional force of a chain at an appropriate level. Preferably, the tensioner body is made of a metal-based material such as steel, cast iron, aluminum, and an aluminum alloy from the viewpoint of strength, workability, economical efficiency.

In addition, the urging mechanism and the press member of the chain tensioner according to the embodiment of the present invention may be formed into any shape including an elastic member such as a spring, a high-pressure fluid such as hydraulic pressure, a combination of an elastic member and a high-pressure fluid, or the like.

First Embodiment

Hereinafter, a description will be given, with reference to the drawings, of a chain tensioner according to a first embodiment of the present invention.

Figure 1A:
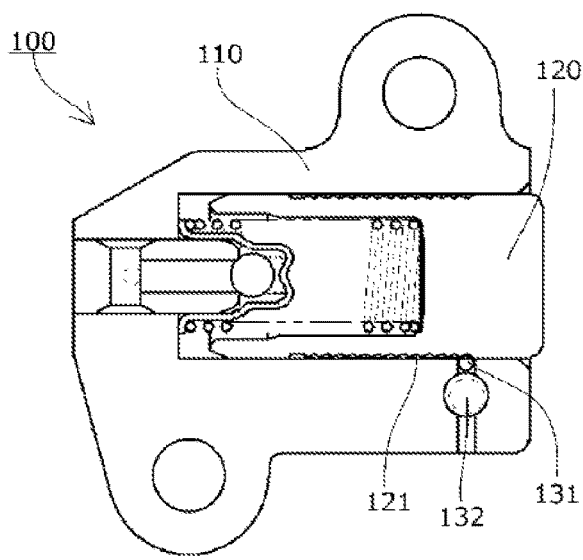
FIGS. 1A and 1B show cross-sectional views of a chain tensioner according to a first embodiment of the present invention when seen from the side thereof and the front thereof, respectively.
Figure 1B:
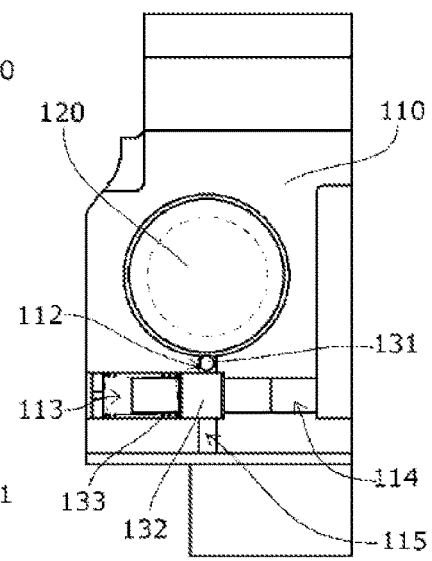
Figure 2A:
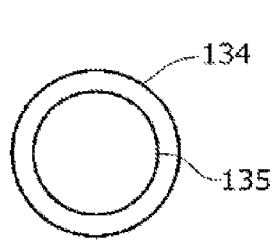
FIGS. 2A and 2B show a side view and a front view of the cam member of the chain tensioner in FIG. 1.
Figure 2B:
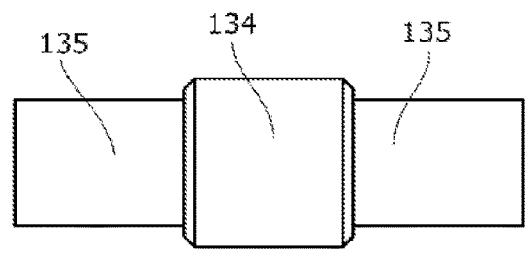

As shown in FIGS. 1 and 2, the chain tensioner 100 according to the first embodiment of the present invention has a tensioner body 110 having a plunger accommodation hole which is open on one side, a plunger 120 slidably inserted in the plunger accommodation hole, and an urging mechanism that urges the plunger 120 in a protruding direction.

The plunger 120 has engagement grooves 121 on the outer periphery thereof. The tensioner body 110 has a cam slide hole 113 in which a slide bar 132 serving as a cam member is accommodated, an extension/retraction hole 112 that communicates with the plunger accommodation hole and the cam slide hole 113, a hydraulic supply path 114 through which pressure oil is supplied to the cam slide hole 113, and an oil discharge hole 115 through which the pressure oil from the cam slide hole 113 is discharged.

In the extension/retraction hole 112, a spherical engagement member 131 that extends/retracts toward/from the engagement grooves from/into the inner peripheral surface of the plunger accommodation hole is accommodated.

The cam slide hole 113 is provided at an area under the plunger accommodation hole so as to extend in a direction perpendicular to the extension/retraction direction of the plunger 120. The hydraulic supply path 114 communicates with the cam slide hole 113 on the same axial line. The oil discharge hole 115 communicates with the cam slide hole 113 at a position opposing the extension/retraction hole 112.

As shown in FIG. 2, the slide bar 132 has a large-diameter portion 134 at the central area thereof and small-diameter portions 135 at the both-end areas thereof. The slide bar 132 is accommodated in the cam slide hole 113 and urged to the side of the hydraulic supply path 114 by a press member 133.

When the large-diameter portion 134 of the slide bar 132 is positioned at the extension/retraction hole 112 of the cam slide hole 113, the engagement member 131 extends from the inner peripheral surface of the plunger accommodation hole and engages with the engagement grooves 121 on the outer periphery of the plunger 120 to stop the operation of the plunger 120. On the other hand, when one of the small-diameter portions 135 of the slide bar 132 is positioned at the extension/retraction hole 112 of the cam slide hole 113, the engagement member 131 retracts into the side of the cam slide hole 113 and disengages from the engagement grooves 121 to set the operation of the plunger 120 free.

Note that the slide bar 132 according to the first embodiment is formed in a simple symmetrical shape. Therefore the manufacturing of the slide bar 132 is facilitated. In addition, the assembling of the chain tensioner 100 is also facilitated since there is no need to align the insertion direction of the slide bar 132 into the cam slide hole 113.

Here, a description will be given, with reference to FIGS. 3A to 3G, of the operation of the chain tensioner 100 configured as described above.

First, as shown in FIG. 3A, until hydraulic pressure is supplied to the hydraulic supply path 114 when an engine stops and immediately after the engine starts, the slide bar 132 is pressed to the side of the hydraulic supply path 114. In this state, the large-diameter portion 134 of the slide bar 132 is positioned at the extension/retraction hole 112 of the cam slide hole 113, and the engagement member 131 extends from the inner peripheral surface of the plunger accommodation hole and engages with the engagement grooves 121 on the outer periphery of the plunger 120 to stop the operation of the plunger 120.

As a result, fluttering caused when a chain greatly changes its tensional force at the start of the engine is prevented, and noise is also reduced.

Next, as shown in FIG. 3B, oil is supplied from the hydraulic supply path 114 slightly after the engine starts. Then, as shown in FIG. 3C, the slide bar 132 slides in the left direction of FIG. 3C when a pressing force in the left direction by the hydraulic pressure is greater than the pressing force of the press member 133, and one of the small-diameter portions 135 of the slide bar 132 is positioned at the extension/retraction hole 112 of the cam slide hole 113. As a result, as shown in FIG. 3D, the engagement member 131 retracts into the side of the cam slide hole 113, and the engagement member 131 and the engagement grooves 121 disengage from each other to set the operation of the plunger 120 free.

At this time, as shown in FIG. 3C, the oil leaking from the gap between the cam slide hole 113 and the small-diameter portion 135 on the right side of the large-diameter portion 134 of the slide bar 132 in FIG. 2 is discharged from the oil discharge hole 115. Therefore, the extension of the engagement member 131 from the extension/retraction hole 112 due to the hydraulic pressure is prevented, and the engagement member 131 and the engagement grooves 121 reliably disengage from each other.

The supply of the oil from the hydraulic supply path 114 is stopped when the engine stops, and the slide bar 132 slides in the right direction of FIG. 3E due to the pressing force of the press member 133 as shown in FIG. 3E.

Then, the engagement member 131 extends, as shown in FIG. 3F, from the extension/retraction hole 112 when the large-diameter portion 134 of the slide bar 132 reaches the extension/retraction hole 112 and engages, as shown in FIG. 3G, with the engagement grooves 121 of the plunger 120 to stop the operation of the plunger 120 at the engagement position.

Note that at assembling, maintenance, or the like, the slide bar 132 is also fixed in the right direction by the pressing force of the press member 133 like the states shown in FIGS. 3A and 3G in which the engine stops. Therefore, there is no need to have an additional configuration and an additional operation for temporarily stopping the protrusion of the plunger.

In the first embodiment, the slide bar 132 is formed in the symmetrical shape having the large-diameter portion 134 at the central area thereof and the small-diameter portions 135 at the both-end areas thereof. However, the slide bar 132 may be formed in various shapes.

Figure 4:
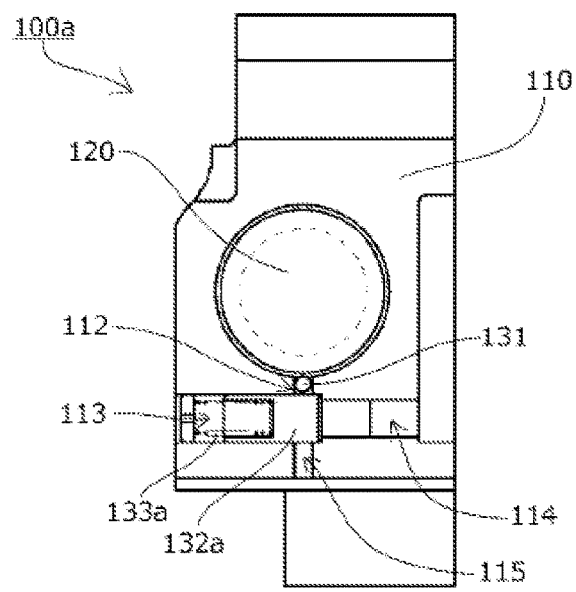
FIG. 4 shows a cross-sectional view of a chain tensioner according to a first modified example of the first embodiment of the present invention when seen from the front thereof.
Figure 5A:
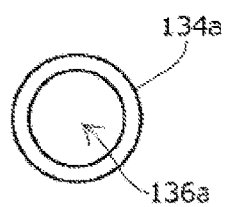
FIGS. 5A, 5B and 5C show both-side views and a front view of the cam member of the chain tensioner in FIG. 4.
Figure 5B:
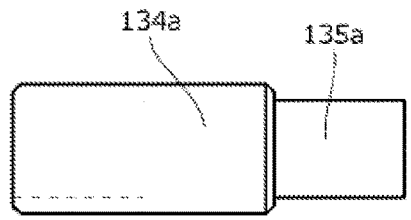
Figure 5C:
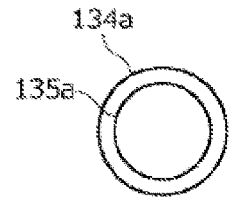

For example, in a chain tensioner 100a according to a first modified example, a slide bar 132a has, as shown in FIGS. 4 and 5, a large-diameter portion 134a that covers an entirety from the central area thereof toward a press member 133a and a hollow hole 136a that is formed from an end surface thereof, and a coil spring that serves as the press member 133a presses the bottom portion of the hollow hole 136a. Other configurations of the chain tensioner 100a are the same as those of the chain tensioner 100 according to the first embodiment.

Thus, the slide bar 132a may be reduced in weight.

Figure 6:
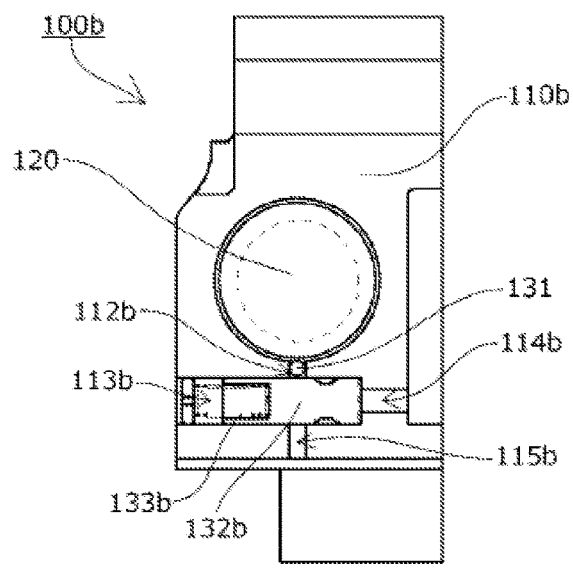
FIG. 6 shows a cross-sectional view of a chain tensioner according to a second modified example of the first embodiment of the present invention when seen from the front thereof.
Figure 7A:
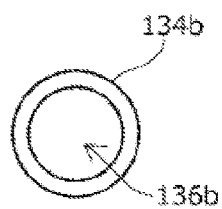
FIGS. 7A, 7B and 7C show both-side views and a front view of the cam member of the chain tensioner in FIG. 6.
Figure 7B:
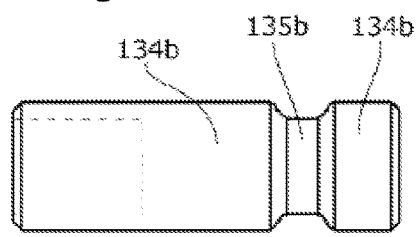
Figure 7C:
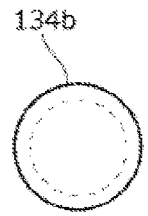

Like the first modified example, in a chain tensioner 100b according to a second modified example, a slide bar 132b has, as shown in FIGS. 6 and 7, a large-diameter portion 134b that covers an entirety from the central area thereof toward a press member 133b and a hollow hole 136b that is formed from an end surface thereof, and a coil spring that serves as the press member 133b presses the bottom portion of the hollow hole 136b.

In addition, in the second modified example, the slide bar 132*b* has a large-diameter portion 134*b* also at an end thereof on the side of a hydraulic supply path 114*b*. Other configurations of the chain tensioner 100*b* are the same as those of the chain tensioner 100*a* according to the first modified example.

Therefore, the inner peripheral surface of the cam slide hole 113*b* that needs dimensional accuracy has only the diameter of the large-diameter portions 134*b* in the slide bar 132*b*. As a result, the working of the cam slide hole 113*b* is facilitated.

Figure 8:
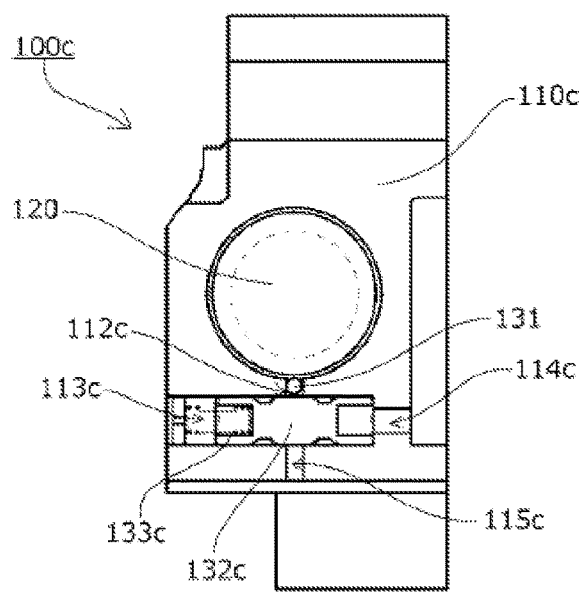
FIG. 8 shows a cross-sectional view of a chain tensioner according to a third modified example of the first embodiment of the present invention when seen from the front thereof.
Figure 9A:
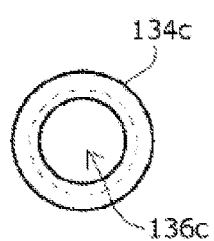
FIGS. 9A, 9B and 9C show both-side views and a front view of the cam member of the chain tensioner in FIG. 8.
Figure 9B:
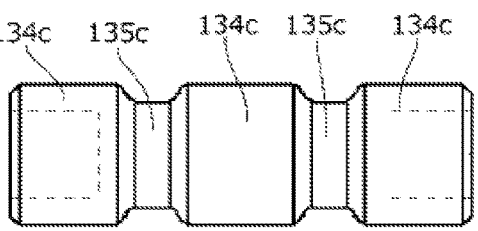
Figure 9C:
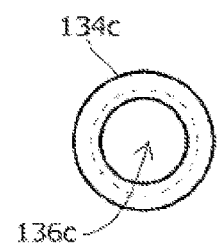

In a chain tensioner 100*c* according to a third modified example, a slide bar 132*c* has, as shown in FIGS. 8 and 9, a large-diameter portion 134*c* at the central area thereof, small-diameter portions 135*c* on both sides of the large-diameter portion 134*c*, large-diameter portions 134*c* at the both-end areas thereof, and a hollow hole 136*c* that is formed from the both-end surfaces thereof, and a coil spring that serves as a press member 133*c* presses the bottom portion of the hollow hole 136*c*. Other configurations of the chain tensioner 100*c* are the same those of the chain tensioner 100*b* according to the second modified example.

Therefore, like the second modified example, the inner peripheral surface of the cam slide hole 113*c* that needs dimensional accuracy has only the diameter of the large-diameter portions 134*c* in the slide bar 132*c*. As a result, the working of the cam slide hole 113*c* is facilitated. In addition, the slide bar 132*c* is formed in the symmetrical shape. As a result, like the first embodiment, the assembling of the chain tensioner 100*c* is also facilitated since there is no need to align the insertion direction of the slide bar 132*c* into the cam slide hole 113*c*.

Second Embodiment

As shown in FIGS. 10 and 11, a chain tensioner 200 according to a second embodiment of the present invention has spiral engagement grooves 221 on the periphery of a plunger 220. Other configurations of the chain tensioner 200 are the same as those of the chain tensioner 100 according to the first embodiment.

In the second embodiment, the engagement grooves 221 are formed in a spiral shape. Therefore, until hydraulic pressure is supplied to a hydraulic supply path 214 immediately after an engine starts, a plunger 220 is allowed to, even if the engagement grooves 221 and an engagement member 231 engage with each other, extend and retract at a low speed in a state in which the chain tensioner 200 receives the slide resistance between the engagement grooves 221 and the engagement member 231 and the rotation resistance of the plunger 220 about the axis of a plunger accommodation hole.

As a result, the plunger 220 may move at a low speed to absorb an appropriate force when the plunger 220 receives a great force. In addition, the plunger 220 is not prevented from vibrating and fluttering since it does not extend and retract at a high speed. Therefore, noise may also be reduced.

Third Embodiment

Figure 12A:
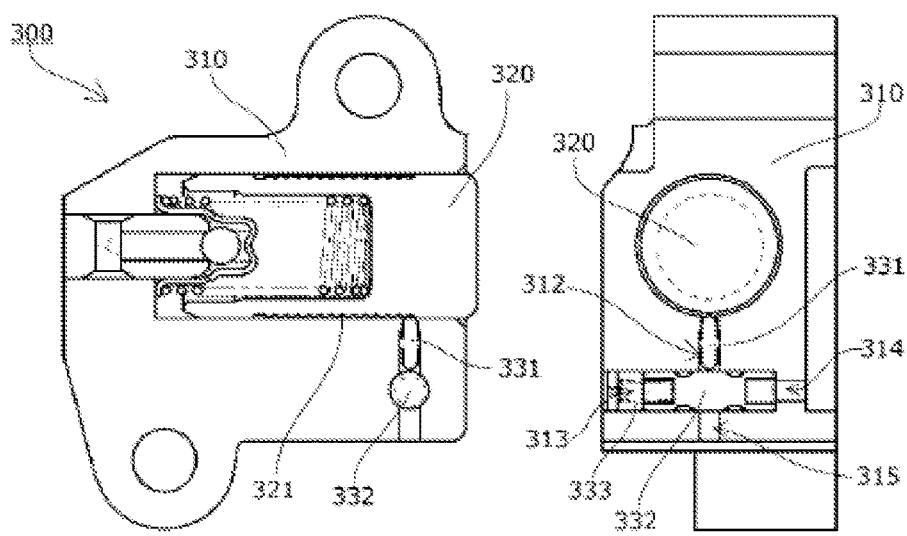
FIGS. 12A and 12B show cross-sectional views of a chain tensioner according to a third embodiment of the present invention when seen from the side thereof and the front thereof, respectively.
Figure 12B:
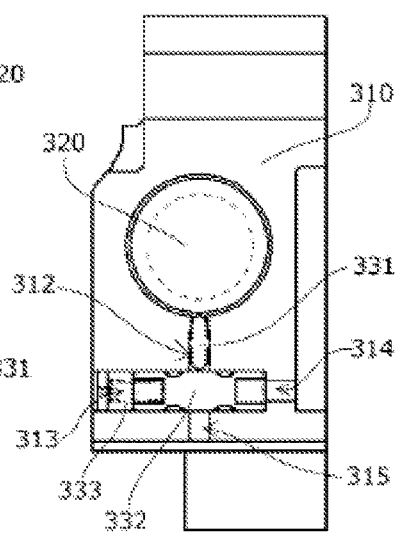
Figure 13A:
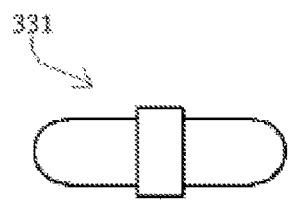
FIGS. 13A and 13B show a side view and a front view of the cam member of the chain tensioner in FIGS. 12A and 12B.
Figure 13B:
Figure 16:
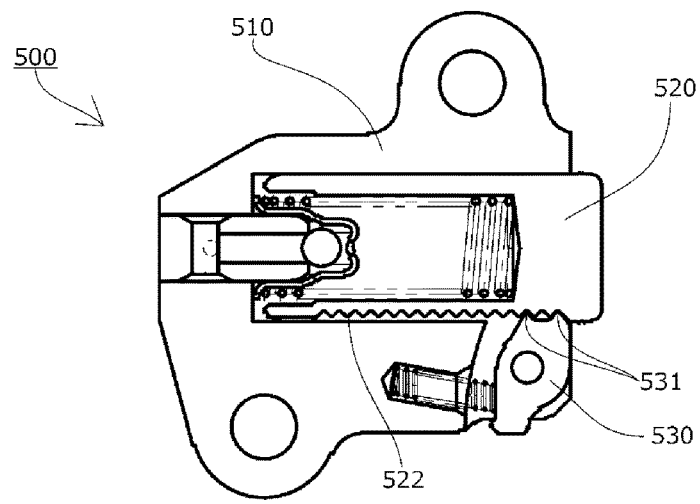
FIG. 16 shows a cross-sectional view of a chain tensioner in the related art when seen from the side thereof.

As shown in FIGS. 12 and 13, a chain tensioner 300 according to a third embodiment of the present invention has an engagement member 331 formed in a rod shape having semi-spherical end surfaces at both ends thereof and a large-diameter portion at the intermediate area thereof, and has a extension/retraction hole 312 formed to be long and stepped. Other configurations of the chain tensioner 300 are the same as those of the chain tensioner 100*c* according to the third modified example of the first embodiment.

Therefore, the distance between a plunger accommodation hole and a cam slide hole 313 may be increased. As a result, the working of the cam slide hole 313 is facilitated.

In addition, when a spring or the like is arranged at the stepped portion to press the engagement member 331 downward, the engagement member 331 is pressed by a slide bar 332 at all times and thus not allowed to move vertically in the extension/retraction hole 312. As a result, the occurrence of noise due to vibration or the like is prevented.

Fourth Embodiment

As shown in FIGS. 14 and 15, a chain tensioner 400 according to a fourth embodiment of the present invention has a slide bar 432 having a large-diameter portion 434 that covers an entirety from the central area thereof toward the side of a press member 433 and a hollow hole 436 that is formed from an end surface thereof, and a coil spring that serves as the press member 433 presses the bottom portion of the hollow hole 436.

In addition, the slide bar 432 has a large-diameter portion 434 also at an end thereof on the side of a hydraulic supply path 414, a small-diameter portion 435 close to the central area relative to the large-diameter portion 434 on the side of the hydraulic supply path 414, and a tapered portion 437 gradually reduced in diameter from the central large-diameter portion 434 toward the small-diameter portion 435.

Other configurations of the chain tensioner 400 are the same as those of the chain tensioner 100*b* according to the second modified example of the first embodiment.

Therefore, by designing the chain tensioner 400 such that, when the supply of oil from the hydraulic supply path 414 is stopped and the slide bar 432 slides in the right direction of FIG. 14, an engagement member 431 and engagement grooves 421 totally engage with each other while the engagement member 431 contacts the middle of the tapered portion 437 of the slide bar 432, and as a result, the engagement member 431 is fixed when the supply of the oil is stopped, and both the occurrence of noise due to vibration or the like and an engagement failure due to thermal deformation, a manufacturing error or the like may be prevented.

In each of the embodiments described above, the slide bar serving as the cam member has a columnar shape or cylindrical shape in cross section. However, the slide bar may have other shapes such as an elliptic shape and a prism shape in cross section.

In addition, the cam member may be of a rotation type or an oscillation type having a stepped portion in the periphery direction thereof, the tensioner body may have an accommodation portion to suit the shape of the cam member, and the press member and the hydraulic pressure may act in the rotation direction or the oscillation direction of the cam member.

Moreover, in each of the embodiments described above, the engagement member is spherical and has a columnar shape in cross section. However, the engagement member may have other shapes.

Further, in each of the embodiments described above, the portion that contacts the cam member and the portion that engages with the engagement grooves of the plunger are formed in a semi-spherical shape. However, the portions may be formed in any shape or may be different in shape at both ends thereof.

Furthermore, the number, the cross-sectional shape, the arrangement range, or the like of the engagement grooves of the plunger may be appropriately set in consideration of the shape, the material, the arrangement position, or the like of the engagement member.

What is claimed is:

1. A chain tensioner comprising:
   a tensioner body having a plunger accommodation hole which is open on one side;
   a plunger slidably inserted in the plunger accommodation hole; and
   an urging mechanism that urges the plunger in a protruding direction,
   wherein the plunger has engagement grooves on an outer periphery thereof, and
   the tensioner body has:
      an engagement member that is formed in a spherical shape and that extends/retracts toward/from the engagement grooves from/into an inner peripheral surface of the plunger accommodation hole;
      a cam member that maintains and releases an extending state of the engagement member;
      a press member that presses the cam member in one direction; and
      a hydraulic supply path through which oil is supplied to press the cam member in a direction opposite to a pressing direction of the press member.

2. The chain tensioner according to claim 1, wherein the cam member is a slide bar that reciprocates linearly.

3. The chain tensioner according to claim 1, wherein the engagement grooves are formed in a spiral shape.

* * * * *